(12) United States Patent
Madeira

(10) Patent No.: US 7,162,997 B2
(45) Date of Patent: Jan. 16, 2007

(54) FLAP ARRANGEMENT IN THE FLANGE AREA OF AN INTAKE SYSTEM FOR AN INTERNAL COMBUSTION ENGINE

(75) Inventor: Pedro Madeira, Asperg (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 11/117,506

(22) Filed: Apr. 29, 2005

(65) Prior Publication Data
US 2005/0241614 A1  Nov. 3, 2005

(30) Foreign Application Priority Data
Apr. 29, 2004  (DE)  ............... 10 2004 021 125

(51) Int. Cl.
  *F02D 9/10*  (2006.01)

(52) U.S. Cl. ..................... 123/336; 123/337

(58) Field of Classification Search ............. 123/336, 123/337
See application file for complete search history.

(56) References Cited

U.S. PATENT DOCUMENTS

| | | | | |
|---|---|---|---|---|
| 5,875,758 A * | 3/1999 | Fujita | .................... | 123/336 |
| 6,234,208 B1 * | 5/2001 | Magdelyns et al. | ......... | 123/337 |
| 6,598,854 B1 * | 7/2003 | Jessberger et al. | .......... | 123/337 |
| 6,604,506 B1 * | 8/2003 | Tanaka et al. | ............... | 123/336 |
| 6,763,802 B1 * | 7/2004 | Brassell | .................... | 123/336 |
| 6,895,826 B1 * | 5/2005 | Nakao et al. | .......... | 73/861.355 |

* cited by examiner

*Primary Examiner*—Erick Solis
(74) *Attorney, Agent, or Firm*—Crowell & Moring LLP

(57) ABSTRACT

An internal combustion engine intake system 10 having a flange area 12 with a first inlet channel 14 and a second inlet channel 13 for each cylinder of the engine and a flap arrangement for closing the second inlet channel 14 arranged in the flange area. The flap arrangement includes an actuating shaft 15 on which flaps 33 are provided for closing each of the second inlet channels 14 when the actuating shaft 15 is operated. The actuating shaft 15 is integrated into the flange area 12 of the intake system 10 and supported by bearing elements 16, which are inserted in mating receptacle profiles 18 formed in the flange area 12, so that the actuating shaft 15 is surrounded by the individual bearing elements 16 over an angular range of substantially greater than 180°.

7 Claims, 3 Drawing Sheets

FLAP ARRANGEMENT IN THE FLANGE AREA OF AN INTAKE SYSTEM FOR AN INTERNAL COMBUSTION ENGINE

BACKGROUND OF THE INVENTION

This invention relates to an intake system for an internal combustion engine having a flange area provided with at least one inlet channel and a flap arrangement for closing the inlet channel, with flaps arranged on an actuating shaft situated in the flange area for opening or closing the inlet channel when the actuating shaft is operated.

An intake system of this general type is known, for example, from DE 195 04 382. This document describes a valve arrangement which is situated in the intake system of an internal combustion engine and has flap valves mounted on an actuating shaft. The flap valve arrangement is integrated into the intake system in such a way as to prevent any negative effect on the flange function and/or mounting function. This is achieved by the flange-side part of the intake system forming a first half-shell for seating of the flap arrangement and integrally molding additional half-shells on a communicating bearing frame so that in the assembled state, the half-shells form a friction bearing.

SUMMARY OF THE INVENTION

It is the object of the present invention to provide an improved valve arrangement for an intake system of an internal combustion engine with flap valves mounted on an actuating shaft.

Another object of the invention is to improve the integration of flap valve bearing elements so as to ensure reliable functioning with simple handling.

These and other objects have been achieved in accordance with the present invention by providing an internal combustion engine intake system having a flange area with at least one inlet channel therein and a flap arrangement for opening and closing the at least one inlet channel, the flap arrangement comprising flaps arranged on an actuating shaft such that the flaps open or close the at least one inlet channel when the actuating shaft is operated, the actuating shaft being integrated into the flange area of the intake system and being bearingly supported by bearing elements provided in the flange area, wherein each of the individual bearing elements surrounds the actuating shaft over an angular range of more than 180°.

The basic idea of this invention is to replace two bearing elements arranged opposite one another by one bearing element for the radial bearing of an actuating shaft. This bearing element surrounds the actuating shaft over an angle range of significantly more than 180°. To this end, a shell-shaped bearing contour forming a bearing face is provided on the bearing element. Outside of the bearing, the bearing contour is opened tangentially. The operator shaft is usually surrounded by the bearing face in a shell form. However, it is also possible to eliminate the use of a flat bearing face and instead to arrange the bearing faces in the form of cams revolving in a circle. In this case, a linear contact occurs between the actuating shaft and the bearing contour, this contact taking place at the vertex of the cam. This minimizes the contact surfaces between the bearing face and the actuating shaft. In this embodiment, leakage between the channels may be created intentionally, for example, and the heat transfer between the selector and the bearing contour may be minimized. The bearing contour of the bearing element is arranged on a side wall that communicates with a receptacle profile of the flange area, whereby the bearing element can be pushed from the end face into the receptacle profile of the flange area and brought into flush contact with a flat surface of the flange area. To permit accurate positioning of the bearing element in the flange area, a shoulder may be provided in the receptacle profile, coming in contact with a contact face of the bearing element in the installed state. The bearing element thus consists of at least one side wall on which is arranged a bearing contour that surrounds the actuating shaft in the form of a claw. On the side opposite the bearing contour, a flat surface of the [sic; omission; flange area] is arranged, forming a flush surface with the flat surface of the flange part in the installed state. The contact face of the bearing element should preferably be arranged between the flat surface of the bearing element and the bearing contour or should be formed by a tangential face of the bearing contour. It is important here that the bearing face is aligned approximately parallel with the flat surface of the bearing element and that no bending of the bearing contour can take place as a result of this contact. The contact face of the bearing element may also be integrally molded on the side wall. In this case, however, it is important to be sure that the claw form is not exposed to any bending stress. The fit ratio between the bearing element and the receptacle profile can also be implemented with a slight prestress, so that possible manufacturing tolerances can be bridged. The receptacle profiles for the bearing elements are arranged in the partitions situated between the inlet channels and on the outside walls of the flange part. To prevent any axial displacement of the bearing elements, there must be a form-fitting connection between the receptacle profile and the bearing element in the axial direction. This can be achieved by accommodating the side wall in a groove of the receptacle profile or by having the side wall form a groove in which a web of the receptacle profile engages. Polyamide [nylon] or polypropylene are available as the material of choice for possible flange areas, and these materials may be fiber-reinforced. The flange area may be manufactured from die-cast aluminum, for example. The bearing element is preferably made of a plastic with good friction properties. For assembly of the bearing arrangement, the bearing element may be mounted on the actuating shaft. Due to the fact that the angle of wrap of the bearing element is greater than 180°, the bearing elements of all bearing points may be clipped into the actuating shaft, in which case they are connected to the actuating shaft in a manner that prevents them from being lost. In another step the bearing elements clipped onto the actuating shaft may also be inserted into the receptacle profiles of the flange area so that the flange area is brought into a premounted installation state. This arrangement permits an advantageous assembly process in which the actuating shaft can be supplied with the bearing elements in a completed form that includes the bearing elements. Handling of the preassembled actuating shaft is thus greatly simplified. The bearing contour consists of a one-piece component, thereby minimizing the risk of the tolerances being cumulative in comparison with multipart bearing elements.

According to one advantageous embodiment, the flap valve arrangement of the invention may be used in situations where there are multiple inlet channels per cylinder. This is the case in particular when a flange part in which the flap valves close the second inlet channel is situated between the engine block and the cylinder head. In this area of use, the flaps ensure an improved turbulence in the intake air supplied. The actuating shaft penetrates through all the inlet channels, a flap being provided on the actuating shaft only on the second inlet channel. It is advantageously possible here to operate the flaps of all cylinders with a continuous actuating shaft.

In another advantageous embodiment of this invention, the bearing element is formed from two side walls, with the two side walls being joined by a web, and the bearing element may be manufactured in one piece. In the installed state, the web connecting the side walls of the bearing element may serve as a contact face in combination with a shoulder. The web should be supported on the edge areas of the side walls, resulting in an H-shaped cross section in the direction of insertion of the bearing element, this cross section predefining the cross section of the receptacle profile in the flange area. In this embodiment, it is advantageously possible to create a broader contact area for the bearing element and therefore the bearing element may also be arranged on larger partitions, yielding a more stable support of the bearing element in the flange area due to the broader contact. Since the side walls of the bearing element are in contact directly in the wall area of the inlet channels, the bending moments of the actuating shaft are ideally absorbed in the edge area of the partitions.

In a further advantageous embodiment of this invention in conjunction with the foregoing, the tangential openings in the two side walls are aligned opposite one another. Since the actuating shaft is surrounded by the bearing element, it is therefore divided between two bearing faces, in which case each individual bearing face has a wrap angle of more than 90° with a minimum wrap of much more than 180°. The maximum angle of wrap of the selector angle may be extended to more than 360°. This is made possible by the fact that the individual bearing contours each have a wrap angle of more than 180°, with each individual bearing contour being pivoted into the actuating shaft separately. The bearing element is formed by a forklike contour in this example, with the two bearing contours representing claws facing one another. For assembly of the bearing element, it is inserted into the actuating shaft with the side walls parallel to the axis of the actuating shaft, and the bearing element is screwed into the actuating shaft in the direction of the tangential openings. An engaging connection between the actuating shaft and the bearing element is achieved when the individual bearing faces have a wrap angle of greater than 180°. In this design variant, it is advantageous that the alignment of the bearing faces can be adjusted to any possible load direction of the actuating shaft. The main load direction of the bearing will be the same as the direction of flow of the air current due to the flow forces. Because of the motor pulsation, however, forces must be absorbed to the full radial extent because of the engine pulsation and because of possible spiral flows. With the design described here it is possible to absorb forces radially to the full extent with a single one-piece bearing element, thereby practically ruling out the risk of flutter of the actuating shaft in the bearing element.

In a refinement of this invention, it is proposed that a side wall spacing that extends between the two side walls be adapted to the diameter of the actuating shaft. Then the distance between the side walls may be reduced to 70% of the diameter of the actuating shaft. In this case the side walls are spread apart in assembly in the elastic range. Therefore the bearing faces between the channel walls can be designed to be very wide and interrupted only by the side wall spacing which ensures the insertion into the actuating shaft.

Another advantageous design variant of this invention is made possible through the integration of a sealing groove into the bearing element. To seal the individual flow channels with respect to one another and with respect to the outside, the individual channels are usually surrounded by a sealing groove which is provided to accommodate a sealing agent such as an elastomer gasket. Since the bearing elements are necessarily arranged in the partitions, this closed groove pattern is interrupted by the bearing element. To be able to continue the groove in the same cross section, the flat surface of the bearing element is designed so that the groove flanks and the base of the groove are continued in a straight line to the sealing groove of the flange area. The side faces of the sealing groove essentially produce a supporting function for the elastomer gasket. The actual sealing takes place on the contact face with the flat side. The allowed tolerance in the area of the base of the groove must therefore be much narrower than the tolerance with respect to the width of the groove. This design makes it possible in an advantageous manner to permit a sealing connection of the individual inlet channels with respect to the outside despite an interruption in the partitions due to the bearing elements.

An advantageous refinement of this invention is made possible through the arrangement of sealing agents on the edges of the side walls of the bearing element. To do so, the surfaces of the side walls which communicate with the bearing seat in the flange area may be provided with an elastomer coating, whereby when using an elastomer coating, one factor that must be taken into account is that the fixation of the bearing element is formed via the contact face and a shoulder on the bearing seat. Another possibility for sealing is obtained by gluing the bearing element in place, in which case the communicating surfaces between the bearing element and the receptacle seat are here again attached in an adhesive joint. This tight joint advantageously reduces the leakage between the channels and also stabilizes the entire fastening of the bearing element, thereby reducing the risk of detachment due to vibration and thermal stresses.

Another advantageous embodiment of this invention is made possible in the design of the communicating connecting surfaces between the inlet channels. Since the actuating shaft is in any case surrounded by the individual bearing faces only in a partial area, it is impossible to completely rule out leakage between the channels. Between the inlet channels, there is always a residual flow cross section through the tangential openings. However, this leakage can be minimized in a controlled manner if the flow cross sections between the inlet channels follow a labyrinthine course. This is achieved for example by designing the side walls to be as thin as possible so that the angle of wrap of the bearing contour is designed to be as large as possible, so that the side walls run as close as possible to the web of the bearing seat and so that the bearing seat of the flange area is adjacent to the actuating shaft with the least possible play. This measure advantageously creates a labyrinthine flow cross section which is designed to be as thin as possible and increases the flow resistance between the inlet channels due to multiple deflections.

These and other features of preferred embodiments of this invention are set forth in the description and the drawing as well as in the claims, whereby the individual features may each be implemented individually or together in the form of subcombinations in embodiments of the invention and in other fields of use and may constitute advantageous and independently patentable inventions for which protection is hereby claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
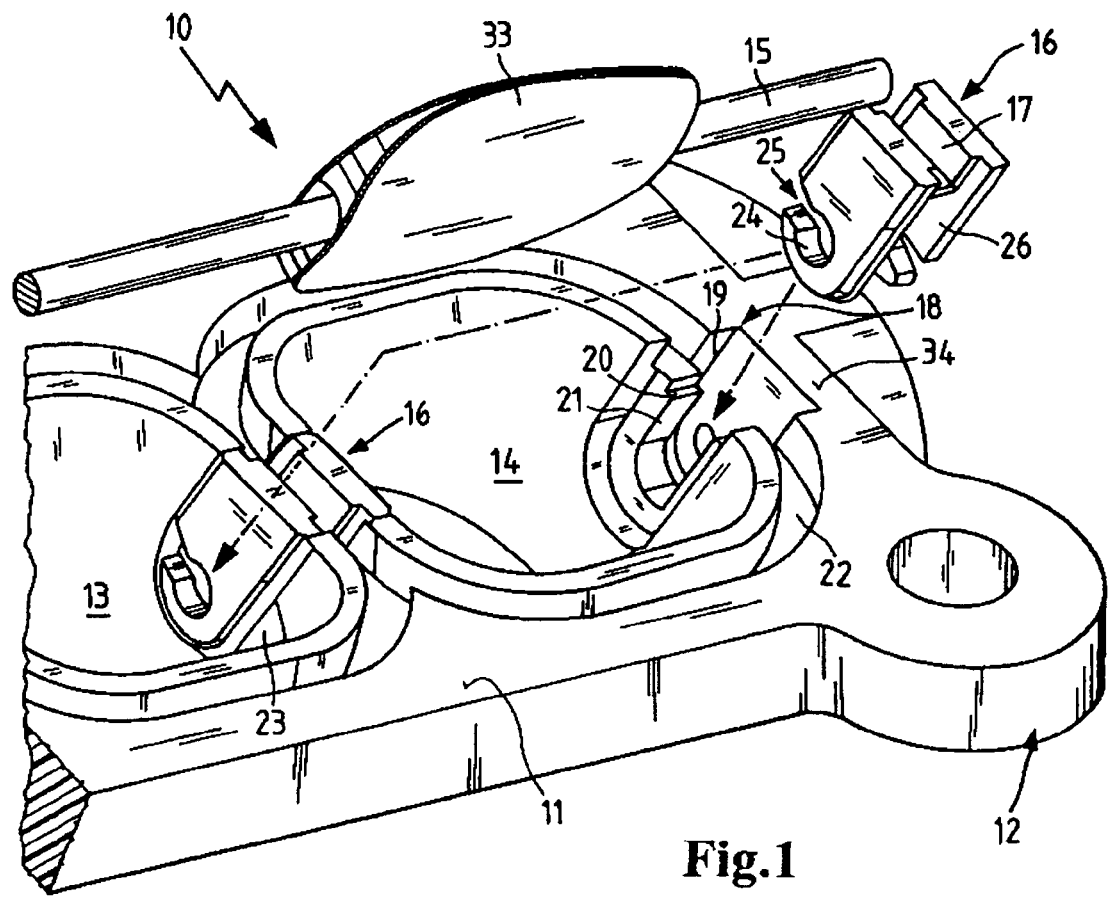
FIG. 1 is a detail view of a flange area in an exploded diagram, in which the components required for operation are depicted separately.

FIG. 1 shows an exploded detail view of a flange area 12 in an intake system 10 having the required elements for fastening the flap bearing. A flap 33 is provided for the installation space of a first inlet channel 14 and is fixedly connected to an actuating shaft 15. A second inlet channel 13 has the shaft 15 passing through it, but is not controlled by any flap. The second inlet channel 13 is separated from the first inlet channel 14 by a partition 23.

In the drawing, a bearing element 16 is shown inserted into the partition 23. In the example shown here, the bearing element 16 introduced into the partition 23 is introduced without the actuating shaft. However, it can be seen here that a flat surface 11 of the flange area 12 and a sealing groove 22 are essentially in flush contact with the bearing element 16 that has been introduced into partition 23. When the engine is completely assembled, flange area 12 communicates with a flange face (not shown), e.g., of an intake pipe or of a cylinder head. In the assembled state, an elastomer gasket (not shown) is arranged in the sealing groove 22, surrounding the individual inlet channels 13, 14 and also establishing a tight seal with respect to the surrounding environment in the area of the bearing elements 16.

Identical receptacle profiles 18 are molded on the partitions 23 and on the outside wall 34, so that the bearing elements 16 may have a standardized design and are exchangeable as needed. The actuating shaft 15 is radially mounted in the bearing elements 16, penetrating through the flange area 12 on one side of the outside wall 34, a drive unit (not shown) being arranged on this side for rotational operation of the actuating shaft 15.

For assembly, the bearing element 16 is guided with the side walls 26 over the actuating shaft 15, and the actuating shaft is then pivoted into the bearing contours 27 in the direction of the tangential openings 25. Once all the bearing elements 16 are positioned on the actuating shaft 15, then the bearing elements 16 with the actuating shaft 15 therein may be pushed into the receptacle profile 18 of the flange area.

In this installed position, the outside contours of the bearing element 16 communicate with the receptacle profile 18 of the flange area 12. The flanks of the receptacle profile 18 form the bearing seat 19, thus preventing the bearing element 16 from being able to twist in the receptacle profile 18. A contact face 29 (visible in FIG. 2) of the bearing element 16 is thereby in contact with the shoulder of the bearing seat 20.

When the bearing element 16 is in the inserted state, the receptacle 17 forms an integrated cross-sectional course of the sealing groove 22. In the mounted state, a web of the bearing seat 21 fills up an area between the side walls 26 of the bearing element 16 and thus forms an additional form-fitting connection to prevent twisting of the bearing element 16 in the receptacle profile 18. The width of the web 21 is coordinated here with the diameter of the actuating shaft 15 so that the flow cross section between the inlet channels can be minimized in an ideal manner.

Figure 2:
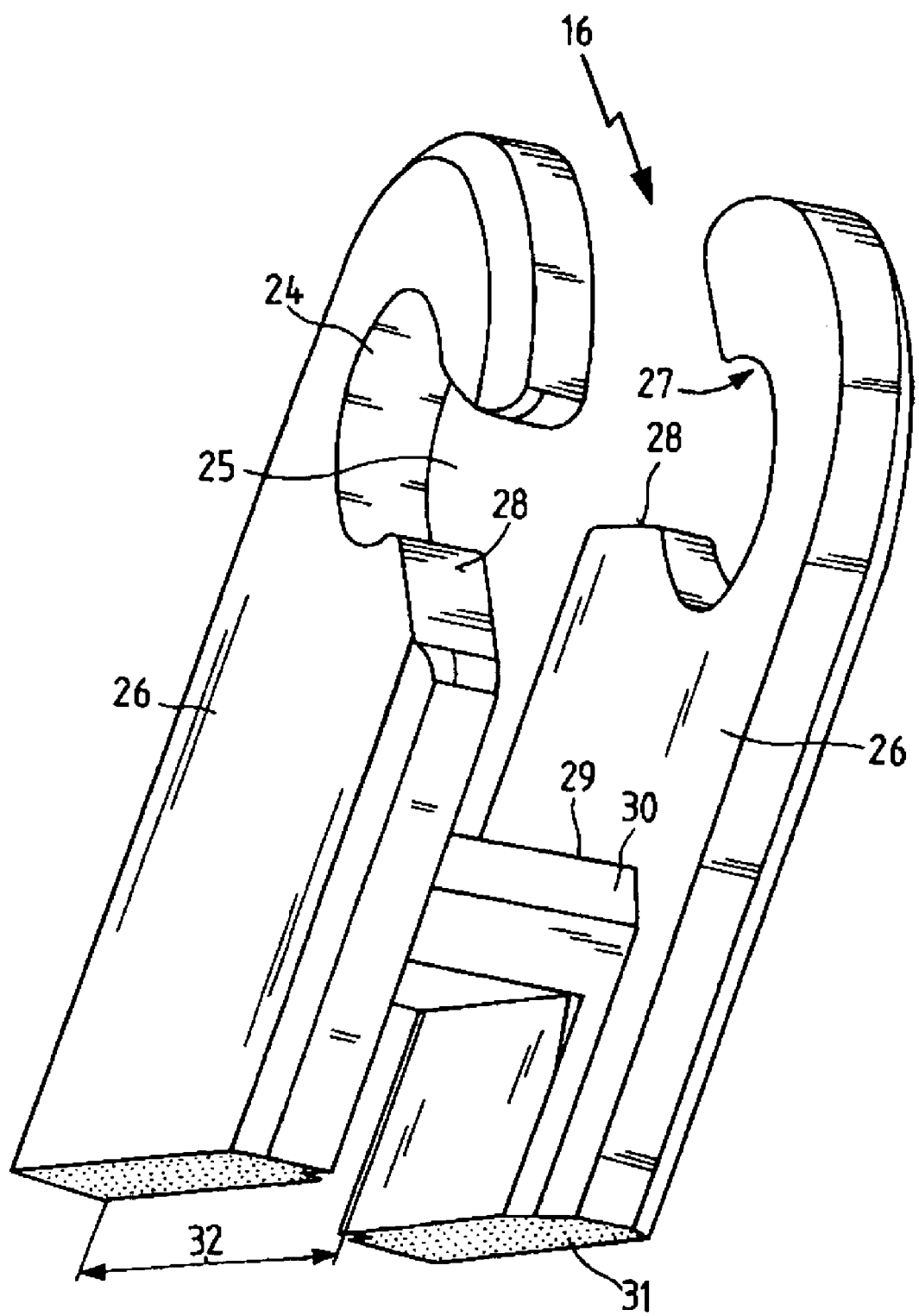
FIG. 2 is a view of an individual bearing element for the actuating shaft.

FIG. 2 shows a perspective diagram of a bearing element 16 in which components corresponding to those in FIG. 1 are identified by the same reference numbers. The bearing element 16 is formed essentially by two side walls 26 and a web 30 which connects the two side walls 26. A flat surface 31 of the bearing element 16 is flush with the flat surface 11 in the installed state (Compare FIG. 1). The side wall spacing 32 in this case corresponds to the groove width of the sealing groove 22 shown in FIG. 1.

The web 30 of the bearing element 16 connects the two side walls 26. In the installed state web 30 sits on a shoulder of the bearing seat 20 (shown in FIG. 1) with the contact face 29. Ring-shaped bearing faces 24 are arranged on the side of the bearing contour 27 on both side walls 26, these bearing contours 27 having tangential openings 25 and these tangential openings 25 open in opposite directions toward the opposing side walls 26.

In the illustrative embodiment shown in FIG. 2, the bearing faces 24 form an angle range of significantly more than 180° and thus permit clipping onto a valve flap actuating shaft 15 (see FIG. 1), taking into account their radial elastically.

In this illustrative embodiment, the tangential faces 28 are arranged with a bevel in the direction of insertion. This beveled or inclined design should facilitate insertion for swiveling onto an actuating shaft. The tangential face 28, however, may also be arranged perpendicular to the direction of insertion and therefore form a contact face which comes in contact with a bearing seat in a receptacle profile, for example.

Figure 3:
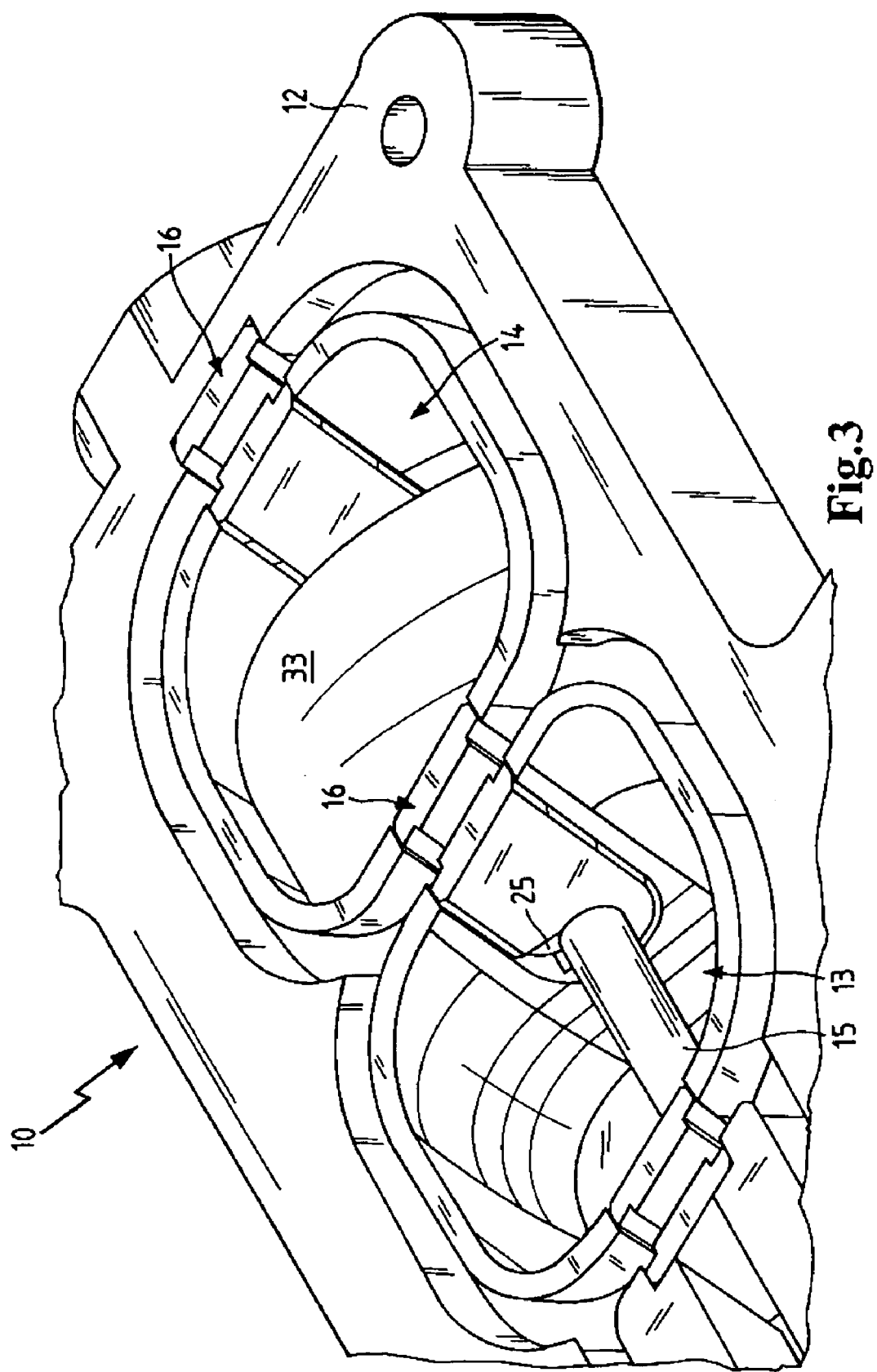
FIG. 3 is a detail view of a flange area in which the bearing element and the switch flap of the invention are installed.

FIG. 3 shows an enlarged detail view of the flange area 12 of the intake system 10. Components corresponding to those in the preceding figures are identified by the same reference numerals. The actuating shaft 15, flap 33 and bearing element 16 are mounted in the flange part 12, and the flap 33 is rotated into a closed state. The bearing element 16 is arranged between the first inlet channel 14 and the second inlet channel 13, with a labyrinthine leakage gap remaining between the two inlet channels, finding its path through the tangential openings 25. Due to this repeated deflection of the leakage current, the flow resistance is increased and leakage is minimized to an allowed extent.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An internal combustion engine intake system having a flange area with at least one inlet channel therein and a flap arrangement for opening and closing the at least one inlet channel, said flap arrangement comprising flaps arranged on an actuating shaft such that the flaps open or close the at least one inlet channel when the actuating shaft is operated, said actuating shaft being integrated into the flange area of the intake system and being bearingly supported by bearing elements provided in said flange area, wherein each of the individual bearing elements surrounds the actuating shaft over an angular range of more than 180° and wherein each bearing element comprises a pair of lateral walls connected by a web, said lateral walls having bearing faces for accommodating the actuating shaft, and each bearing face having an associated tangential opening for facilitating insertion of the actuating shaft into the bearing element in contact with the bearing face.

2. An intake system according to claim 1, wherein a plurality of inlet channels are arranged in the flange area for each cylinder of the engine; the actuating shaft is arranged to pass continuously through all of the inlet channels, and flaps are arranged only in one inlet channel of each cylinder.

3. An intake system according to claim 1, wherein the tangential openings in the pair of lateral walls are arranged to open in opposite directions.

4. An intake system according to claim 1, wherein said pair of lateral walls of each bearing element are spaced apart a distance corresponding to the diameter of the actuating shaft.

5. An intake system according to claim 1, wherein the bearing elements form a part of a peripheral groove surrounding each of the individual inlet channels.

6. An intake system according to claim 1, wherein the bearing elements are provided with sealing means on their outside contour to minimize leakage between adjacent channels at the edges of the side walls.

7. An intake system according to claim 1, wherein each bearing element is formed to have the greatest possible enclosure around the actuating shaft so that a labyrinth is formed between adjacent inlet channels.

* * * * *